Nov. 14, 1939.  C. L. SCOTT  2,180,068
DOMESTIC COOKING APPARATUS
Filed March 22, 1938  2 Sheets-Sheet 1
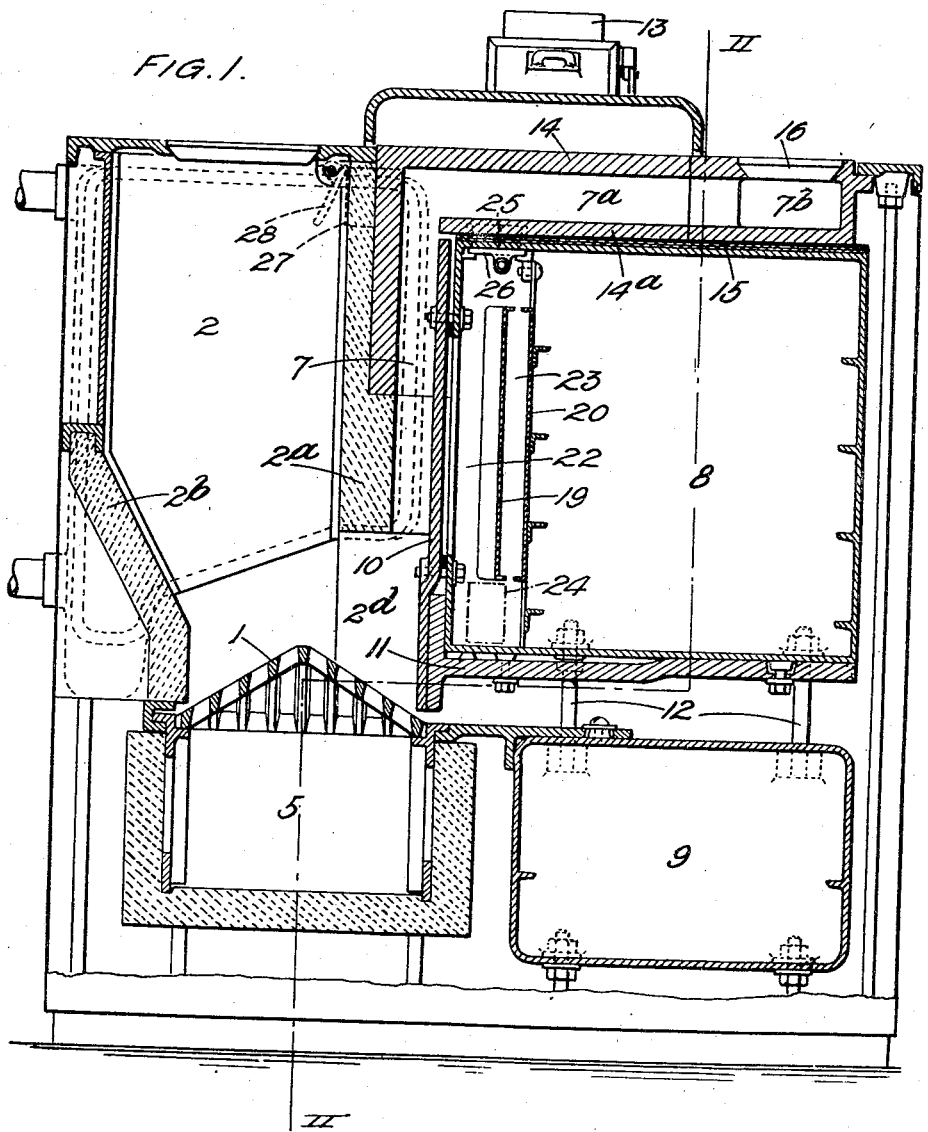

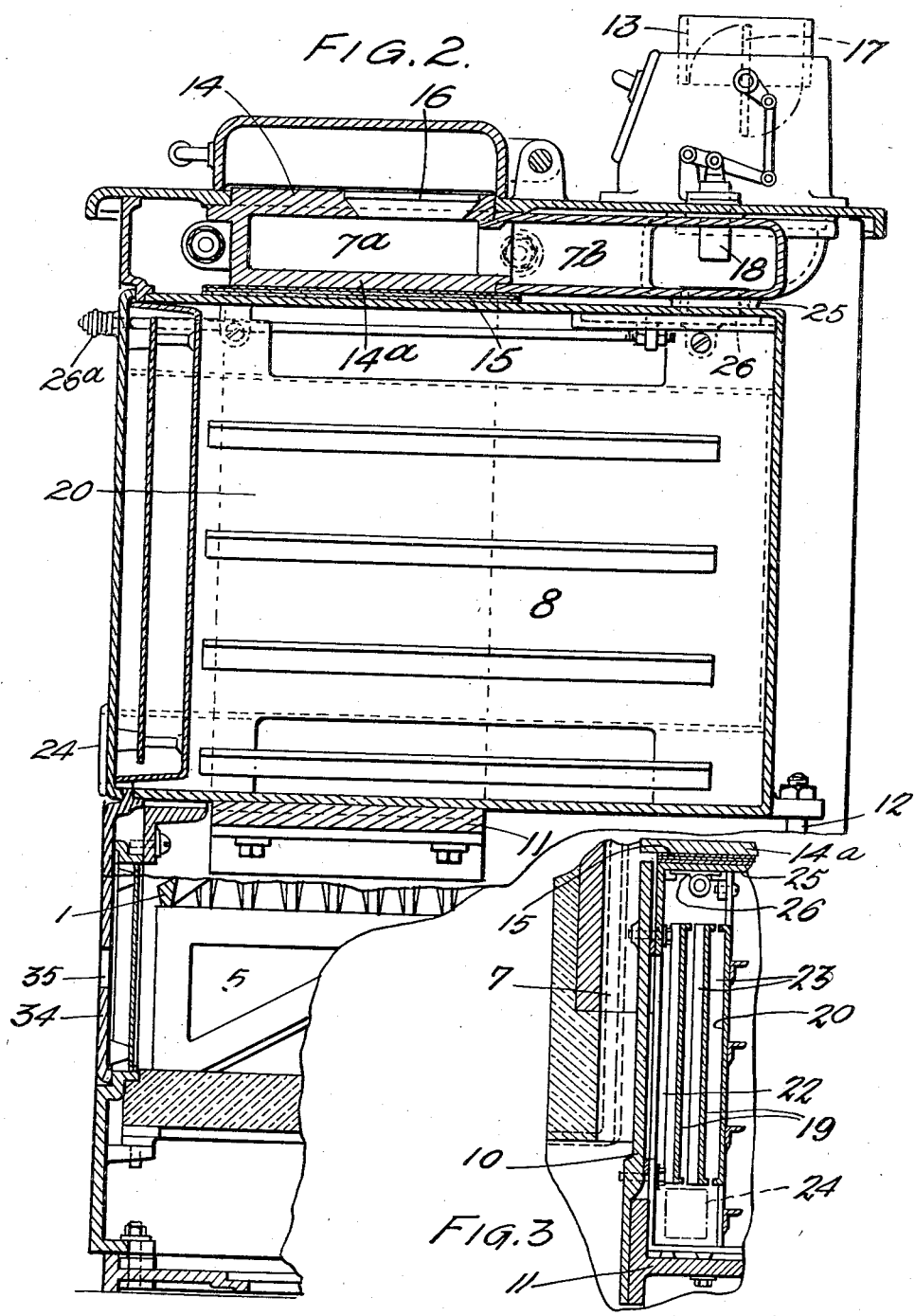

Patented Nov. 14, 1939

2,180,068

UNITED STATES PATENT OFFICE 2,180,068

DOMESTIC COOKING APPARATUS

Charles Ludovic Scott, London, England, assignor to Allied Ironfounders Limited, London, England, a British company Application March 22, 1938, Serial No. 197,453
In Great Britain August 10, 1937

5 Claims. (Cl. 126—1)

This invention relates to cooking stoves adapted for continuous burning and using solid fuel.

According to a primary feature of the invention the output from the fire in a stove of this kind is employed to heat at least two heat-consumption members or groups of heat-consumption members, the first, including one or more cooking ovens, being heated almost entirely by conduction from radiant fuel in direct contact therewith, and the second including one or more hotplates beneath which the hot gases of combustion are diverted, the gases heating the hot plates by convection and the said oven or ovens being insulated from, and virtually independant of, the convected heat of the said gases where these pass beneath the hot plate, so that substantially all the convected heat is concentrated on the hot plate.

By the term "heat-consumption member" is meant any member of a boiler or stove which derives heat from the fire and utilises it for purposes such as heating, water-heating or cooking. Examples of heat-consumption members are boilers, ovens, hotplates and grillers. The term does not include structural parts per se which, by virtue of their position, must essentially derive heat from the fire, e. g., the grate bars.

The invention also includes a cooking stove controlled by damper in the flue including a hopper-fed fire grate, an oven or ovens located at one side of the said fire grate, a heavy metallic member adapted to heat one or both of said ovens at least on the side adjacent the fire by direct contact with radiant fuel, an upcomer pass arranged between the fire and the said oven, a horizontal upper pass for the flue gases, running beneath the hotplate and above the top of the oven which is (are) insulated from the convected heat of the flue gases, and a return upper pass adapted to divert the flue gases towards the back of the stove beneath the hot plate and outwardly through the flue.

In one constructional form the radiant fuel is in direct contact with the side of the oven and with a metallic structural member passing beneath the oven, and even temperature is maintained in the oven by means of one or more substantially vertical baffles lying in a plane parallel to said heated side wall, and spaced therefrom, but located at the same end of the oven, whereby the air between the heated wall and the baffle or baffles, and between the baffles themselves, will rise and will circulate within the oven.

If it is desired to reduce the temperature in the oven, an air inlet may be provided, admitting air at the base of the baffle or baffles, and a further air outlet may be provided, one of these being adjustable from zero upwardly, to pass a predetermined quantity of air for the purpose of cooling the baffle and/or side wall of the oven.

If desired, a subsidiary oven may be located below the main oven, also deriving its heat by conduction.

One embodiment of the invention will now be described with reference to the accompanying drawings, whereof:

Fig. 1 shows a longitudinal section through a cooker;

Fig. 2 shows a part cross section taken on the line II—II of Fig. 1, and

Fig. 3 is a fragmentary sectional view illustrating a modification.

Throughout the specification and drawings, like parts will be referred to and illustrated by like reference numerals.

Referring to the drawings, the fire is located on the grate 1, beneath which is the ashpit 5, fuel being inserted into the hopper 2.

The hopper 2 is bounded at the front by a fire-brick wall, on the side nearest the edge of the cooker by a further wall with a fire-brick deflector 2b at the bottom, and on the side inwardly towards the cooker by a further wall 2a also made wholly or partly of fire-brick, especially its lower portion or nose.

At the side of the hopper 2 and the fire are located two ovens 8 and 9, one above the other, the oven 8 being the main oven, whilst the oven 9 is the subsidiary oven.

The ovens 8 and 9 are heated almost entirely by direct metallic conduction, since when fuel is inserted into the hopper 2 it falls down on top of the grate 1 filling the fire zone 2d. When this fuel is ignited, the radiant fuel is in direct contact with the plate 10 and in substantially direct contact with the heavy member 11 of the heat resistant steel which forms part of the side wall and base of the oven 8. The oven 8 is heated by conduction from the members 10 and 11, whilst the oven 9 is heated partly by radiation from the member 11 above it, and also partly by conduction through the metal members 12, which connect the two ovens together.

The combustion gases from the fire burning in the fire zone 2d pass upwardly into the passage 7 between the wall 2a and the oven 8, and then strike the underside of the top plate 14 of the apparatus, thence moving laterally above the top of the oven 8 in the passage 7a, and being diverted across from front to back of the stove in the passage 7b, finally passing out through the flue passage 13.

The upper and lower walls of the passage 7a, 7b are of metal and may have a certain heat storage capacity, depending upon their thickness. In order to prevent the flue gases in the passage 7, 7a from imparting their heat to the top of the oven 8, an insulation sheet 15 of asbestos millboard or the like, is employed above the top of the oven, beneath the wall 14a of the passage 7a for flue gases.

One or more hotplate rings 16 are provided on top of the passage 7a, preferably being detachable for rapidity of boiling where desired, and also for cleaning the flue 7a, 7b.

Primary air for the fire entering through the draft opening 35 in the ash clean out door 34 has free access to the underside of the grate 1, via the ashpit 5, the combustion in the cooking fire zone 2d being controlled by a cooker damper 17 located in the passage of the combustion gases at the bottom of the flue 13, and controlled by means of a thermostat 18 sensitive to the temperature of the flue gases and surrounding parts of the flue channel 7a or 7b.

The thermostat 18 is set so that the cooker cannot exceed predetermined minimum and maximum temperatures.

Since the oven 8 is heated to a great extent by the radiant fire playing on, and being in contact with, the plate 10 at the side of the oven 8, it follows that the oven will be liable to be hotter at that side.

In order to ensure circulation in the oven, one or more baffles 19, 20, are located within the oven, in a plane parallel to the wall 10, the said baffles projecting for part of the distance up and down the oven but leaving a space between their top and bottom and the top and bottom of the oven, so that air in the space 22 between the side wall 10 of the oven and the baffle 19, and air in the space 23 between the baffles 19 and 20, will be caused to rise and thus to circulate in the oven, thereby ensuring a constant temperature throughout the oven.

In the modification shown in Fig. 3, a plurality of baffles 19 are employed, parallel to the baffle 20 and to the heated oven wall.

If it should be desired to control the temperature of the oven 8 by reducing it at any time, irrespective of the action of the thermostat 18, this may be done by admitting air at the air inlet 24 at the front of the oven and shown in dotted lines, so that it plays on the baffles 19 and 20 and the side walls 10 as it is carried upwards by the air circulation, and by providing a variable air outlet 25 at the top of the oven 8, regulated by a valve 26 controlled from the exterior of the stove by a handle 26a.

I claim:

1. A domestic stove fired by solid fuel including a fire grate and at least two heat consumption members or groups of heat consumption members, the first including at least one cooking oven located at one side of said fire grate, a heavy metallic member of heat-resistant steel in heat-conductive relationship with said oven at least on the side adjacent the fire by direct contact with radiant fuel, and the second including at least one hotplate deriving heat from the combustion gases by convection, and insulating means for said oven adapted to insulate it from the convected heat of said gases adjacent the point where convected heat is being transferred to the hotplates.

2. A cooking stove including a fire-grate, a hopper feeding solid fuel on to said grate, a flue for combustion gases, a damper in said flue controlling combustion, at least one oven located at one side of said fire-grate, a heavy metallic member of heat-resistant steel in heat-conductive relationship with said oven at least on the side adjacent the fire by direct contact with radiant fuel, an upcomer pass arranged between the fire and said oven, a horizontal upper pass for flue gases running across the top of said oven, at least one hotplate located in the upper wall of said upper pass, heat-insulating means between the bottom wall of said upper pass and the top of said oven, and a return upper pass across the top of the oven similarly insulated therefrom, adapted to divert the flue gases towards the back of the stove beneath the said hotplate towards the said flue.

3. A cooking stove including a fire-grate, a hopper feeding solid fuel on to said grate, a flue for combustion gases, a damper in said flue controlling combustion, at least one oven located at one side of said fire-grate, a heavy metallic member of heat-resistant steel in heat-conductive relationship with said oven at least on the side adjacent the fire by direct contact with radiant fuel, a baffle within said oven substantially parallel to and spaced adjacent the wall of said oven heated by said heavy metallic member whereby air between said baffle and said heated wall will rise and circulate within said oven, an upcomer pass arranged between the fire and said oven, a horizontal upper pass for flue gases running across the top of said oven, at least one hot plate located in the upper wall of said upper pass, heat-insulating means between the bottom wall of said upper pass and the top of said oven, and a return upper pass across the top of the oven similarly insulated therefrom, adapted to divert the flue gases towards the back of the stove beneath the said hotplate towards the said flue.

4. A cooking stove as claimed in claim 3, wherein a plurality of baffles are employed, parallel to the first baffle and to the heated oven wall.

5. A cooking stove including a fire-grate, a hopper feeding solid fuel on to said grate, a flue for combustion gases, a damper in said flue controlling combustion, at least one oven located at one side of said fire-grate, a heavy metallic member of heat-resistant steel in heat-conductive relationship with said oven at least on the side adjacent the fire by direct contact with radiant fuel, a baffle within said oven and substantially parallel to and spaced adjacent the wall of said oven heated by said heavy metallic member whereby air between said baffle and said heated wall will rise and circulate within said oven, means for admitting air to the lower part of said oven, means for releasing air from the upper part of said oven whereby cold air may be introduced to exert a cooling action on said baffle, an upcomer pass arranged between the fire and said oven, a horizontal upper pass for flue gasses running across the top of said oven, at least one hotplate located in the upper wall of said upper pass, heat-insulating means between the bottom wall of said upper pass and the top of said oven, and a return upper pass across the top of the oven similarly insulated therefrom, adapted to divert the flue gases towards the back of the stove beneath the said hotplate towards the said flue.

CHARLES LUDOVIC SCOTT.